(12) United States Patent
Deymonnaz et al.

(10) Patent No.: US 10,992,482 B2
(45) Date of Patent: Apr. 27, 2021

(54) VERIFIED BOOT AND KEY ROTATION

(71) Applicant: Google LLC, Mountain View, CA (US)

(72) Inventors: Alejandro Martin Deymonnaz, San Francisco, CA (US); Darren David Krahn, Saratoga, CA (US); David Zeuthen, Foxborough, MA (US)

(73) Assignee: Google LLC, Mountain View, CA (US)

( * ) Notice: Subject to any disclaimer, the term of this patent is extended or adjusted under 35 U.S.C. 154(b) by 64 days.

(21) Appl. No.: 15/841,894

(22) Filed: Dec. 14, 2017

(65) Prior Publication Data
US 2018/0198629 A1   Jul. 12, 2018

Related U.S. Application Data

(60) Provisional application No. 62/445,717, filed on Jan. 12, 2017.

(51) Int. Cl.
*H04L 9/32* (2006.01)
*G06F 9/4401* (2018.01)
*G06F 21/57* (2013.01)
*H04L 9/30* (2006.01)
(Continued)

(52) U.S. Cl.
CPC .......... *H04L 9/3263* (2013.01); *G06F 9/4401* (2013.01); *G06F 21/575* (2013.01); *H04L 9/0891* (2013.01); *H04L 9/0894* (2013.01); *H04L 9/30* (2013.01); *H04L 9/3265* (2013.01); *H04L 63/0823* (2013.01)

(58) Field of Classification Search
CPC ....... H04L 9/3263; H04L 9/0894; H04L 9/00; H04L 63/0823; H04L 9/3265; H04L 9/0891; H04L 9/30; G06F 21/575; G06F 9/4401
See application file for complete search history.

(56) References Cited

U.S. PATENT DOCUMENTS

| 8,386,763 | B1 | 2/2013 | Spangler et al. |
| 8,621,196 | B2 | 12/2013 | Pasam et al. |
| 8,719,585 | B2 | 5/2014 | Grigor et al. |

(Continued)

FOREIGN PATENT DOCUMENTS

EP   2196936   6/2010

OTHER PUBLICATIONS

International Search Report and Written Opinion issued in International Application No. PCT/US2017/066330, dated Apr. 17, 2018, 20 pages.

(Continued)

*Primary Examiner* — Abu S Sholeman
(74) *Attorney, Agent, or Firm* — Shumaker & Sieffert, P.A.

(57) ABSTRACT

Methods, systems, and apparatus, including computer-readable media, for verified boot and key rotation. In some implementations, a device extracts a public key from a secure data storage area of the device. The device extracts a first certificate for an intermediate key and a second certificate for a signing key, the first certificate and the second certificate being extracted from a system image. The device verifies a signature of the first certificate using the public key. After verifying the signature of the first certificate, the device verifies the second certificate using a public key in the first certificate. In response to verifying the second certificate, the device loads the system image during a boot process of the device.

19 Claims, 6 Drawing Sheets

(51) Int. Cl.
*H04L 9/08* (2006.01)
*H04L 29/06* (2006.01)

(56) References Cited

U.S. PATENT DOCUMENTS

| | | | | |
|---|---|---|---|---|
| 8,954,732 | B1* | 2/2015 | Watsen | H04L 9/3263 |
| | | | | 713/157 |
| 9,064,118 | B1 | 6/2015 | Reinauer | |
| 9,195,831 | B1 | 11/2015 | Condra et al. | |
| 9,537,745 | B1 | 1/2017 | Halcrow et al. | |
| 9,569,638 | B2 | 2/2017 | Zatko et al. | |
| 2002/0143987 | A1* | 10/2002 | Sadler | H04L 63/0823 |
| | | | | 709/238 |
| 2005/0033978 | A1 | 2/2005 | Hyser | |
| 2005/0091496 | A1 | 4/2005 | Hyser | |
| 2008/0082680 | A1 | 4/2008 | Grewal et al. | |
| 2008/0133929 | A1* | 6/2008 | Gehrmann | G06F 21/51 |
| | | | | 713/179 |
| 2008/0165952 | A1 | 7/2008 | Smith et al. | |
| 2010/0011350 | A1 | 1/2010 | Zayas | |
| 2010/0185845 | A1* | 7/2010 | Takayama | G06F 21/575 |
| | | | | 713/2 |
| 2012/0151199 | A1 | 6/2012 | Shriver | |
| 2012/0210115 | A1 | 8/2012 | Park et al. | |
| 2013/0031371 | A1 | 1/2013 | Mclellan et al. | |
| 2013/0282951 | A1 | 10/2013 | Kuo et al. | |
| 2014/0164725 | A1 | 6/2014 | Jang et al. | |
| 2015/0012738 | A1 | 1/2015 | Shah et al. | |
| 2015/0154030 | A1 | 6/2015 | Schmalz | |
| 2016/0028550 | A1* | 1/2016 | Gaddam | H04L 9/3215 |
| | | | | 713/173 |
| 2016/0125187 | A1 | 5/2016 | Oxford | |
| 2017/0097830 | A1 | 4/2017 | Ehrenberg et al. | |
| 2017/0286665 | A1* | 10/2017 | Miranda | G06F 21/54 |

OTHER PUBLICATIONS

"Advanced Security Mechanisms for Machine Readable Travel Documents and eIDAS Token—Technical Guideline TR-03110-1," Bundesamt fur Sicherheit in der Informationstechnik, Version 2.20, Feb. 26, 2015, 22 pp.

International Preliminary Report on Patentability from International Application No. PCT/US2017/066330, dated Mar. 21, 2019, 27 pp.

International Search Report and Written Opinion of International Application No. PCT/US2017/066330, dated Nov. 2, 2018, 9 pp.

android.googlesource.com [online] "avb_sysdeps.h" Copyright 2016 The Android Open Source Project, [retrieved on Apr. 5, 2018] Retrieved from Internet: URL<https://android.googlesource.com/platform/external/avb/+/master/libavb/avb_sysdeps.h> 5 pages.

'android.googlesource.com' [online] "Android Verified Boot 2.0," Last Updated on Mar. 27, 2017 [retrieved on Apr. 5, 2018] Retrieved from Internet via Wayback Internet Archive: URL<https://web.archive.org/web/20170515171640/https:/source.android.com/security/verifiedboot/verified-boot> 13 pages.

'android.googlesource.com' [online] "avb_ab_flow.h" Copyright 2016 The Android Open Source Project, [retrieved on Apr. 5, 2018] Retrieved from Internet: URL<https://android.googlesource.com/platform/external/avb/+/master/libavb_ab/avb_ab_flow.h> 8 pages.

'android.googlesource.com' [online] "avb_slot_verify.h" Copyright 2016 The Android Open Source Project [retrieved on Apr. 5, 2018] Retrieved from Internet: URL<https://android.googlesource.com/platform/external/avb/+/master/libavb/avb_slot_verify.h> 10 pages.

'android.googlesource.com' [online] "bootimg.h" Available on or before Apr. 12, 2016, [retrieved on Apr. 2, 2018 from the Wayback Machine] Retrieved from Internet: URL<https://android.googlesource.com/platform/system/core/+/master/mkbootimg/bootimg.h> via Wayback Machine Internet Archive at URL<https://web.archive.org/web/20160412180052/https:/android.googlesource.com/platform/system/core/+/master/mkbootimg/bootimg.h> 4 pages.

'androidsource.com' [online] "avb_ops_h" Copyright 2016 The Android Open Source Project, [retrieved on Apr. 5, 2018] Retrieved from Internet: URL<https://android.googlesource.com/platform/external/avb/+/master/libavb/avb_ops.h> 9 pages.

'en.wikiepedia.org' [online] "X.509" Last updated on Mar. 29, 2018 [retrieved on Apr. 2, 2018] Retrieved from Internet: URL<https://en.wikipedia.org/wiki/X.509 > 15 pages.

'lwn.net' [online] "dm-verity," Jonathan Corbet, Sep. 19, 2011, [retrieved on Apr. 2, 2018] Retrieved from Internet: URL<https://lwn.net/Articles/459420/> 6 pages.

'www.chromium.org,' [online] "The Chromium Projects: Verified Boot," Available on or before Nov. 24, 2016, [retrieved on Apr. 5, 2018] Retrieved from Internet: URL<https://www.chromium.org/chromium-os/chromiumos-design-docs/verified-boot> 7 pages.

Invitation to Pay Fees issued in International Application No. PCT/US2017/066330, dated Feb. 15, 2018, 15 pages.

'github.com' [online] "SSL certificate chain resolver," Zakjan, Jan. 19, 2015, [retrieved on May 29, 2018] Retrieved from Internet Archive: URL<https://web.archive.org/web/20150121152500/https:/github.com/zakjan/cert-chain-resolver/> [Archival date Jan. 21, 2015] 2 pages.

Response to communication pursuant to Rule 161(1) and 162 EPC from counterpart EP application No. 17823327.6, filed Jan. 13, 2020, 18 pgs.

Response to Communication pursuant to Article 94(3) EPC from counterpart EP Application No. 17823327.6 dated Sep. 25, 2020, filed Jan. 13, 2021, 14 pgs. (1233-712EP01).

Communication pursuant to Article 94(3) EPC from counterpart EP Application No. 17823327.6 dated Sep. 25, 2020, 4 pgs. (1233-712EP01).

* cited by examiner

600

| Step |
|---|
| Read the Permanent Product Attributes and extract the PRK Public Key Modulus and the Product ID. 601 |
| Hash the Permanent Product Attributes and verify against the fused hash. 602 |
| Read the PIK, PSK, and SSK minimum version values from tamper-proof storage. 603 |
| Extract the PIK Certificate, PSK Certificate, and SSK Version from the public key metadata in software image. 604 |
| Verify the PIK Certificate signature using the PRK Public Key Modulus. 605 |
| Verify the PIK Certificate usage. 606 |
| Verify the PIK Certificate key version against the PIK minimum version. 607 |
| Verify the PSK Certificate using the PIK public key in the PIK Certificate. 608 |
| Verify the PSK Certificate subject against the Product ID (from the Permanent Product Attributes). 609 |
| Verify the PSK Certificate usage. 610 |
| Verify the PSK Certificate key version against the PSK minimum version. 611 |
| Verify the PSK Public Key Modulus in the PSK Certificate matches the public key from the software image. 612 |
| Verify the SSK version (from public key metadata) against the SSK minimum version 613 |

FIG. 6

VERIFIED BOOT AND KEY ROTATION

CROSS-REFERENCE TO RELATED APPLICATION

This application claims the benefit of U.S. Provisional Patent Application Ser. No. 62/445,717, filed on Jan. 12, 2017, the entire contents of which are incorporated herein by reference.

BACKGROUND

The present specification relates to security for electronic devices, including verified boot and key rotation.

Computing devices are generally initialized during a boot process that loads an operating system and other software modules. If insecure or malicious software is loaded during the boot process, a user's device and data may be at risk. Accordingly, techniques to verify the integrity of software during boot are needed.

SUMMARY

In some implementations, a system enables devices to verify the contents of their software images during boot to avoid executing potentially hazardous code. The software can be signed using a key arrangement that allows software components from many different providers to be separately signed and verified. Information about the overall combination of software components is also signed by a product developer's key, which indicates that the overall combination of components in the software image is approved. For example, a partition with metadata about the components of a software image can be signed by a developer's key. When the image-level signature is validated, the device can determine that the correct set of modules are present. With this system, a developer can ensure that the desired versions of an operating system, hardware drivers, and other components are all used together. Signatures for individual software components can be used to verify that the individual components have not been improperly altered.

The system can support rotation of various different signing keys to enhance security. Devices can ensure that the versions of keys used to sign software components and software images satisfy minimum version requirements, so that outdated keys are not trusted. Each device can enforce the key version requirements and maintain secure data indicating the minimum key version allowed. Software updates that are provided to the device can include key version numbers in signed data, so that devices can verify that the indicated version numbers are correct.

The arrangement of signing keys can permit a server system or other computing system to automate the process of generating signed software updates. Product developers can delegate signing authority to a platform provider system, which can store the private keys for many products and developers. Each product can have its own set of keys, which the platform provider system updates periodically or on demand. The platform provider system uses these keys to generate software images and updates for product developers.

The platform provider system can maintain a library or database of software modules from different vendors, e.g., an operating system vendor, a hardware platform vendor, and so on. The platform provider system also stores signatures and public key information for the various software modules. Developers can use an interface with the platform provider system to select sets of software modules from the library to assemble a desired system image. The platform provider system then packages the selected software modules into a software image, including signing the combination of modules with the key designated for the product. By using multiple levels of signatures, e.g., signing individual software modules as well as the overall combination of modules, the platform provider system can efficiently generate software updates for large numbers of products and developers. The platform provider system can also automate the process of generating signatures and software updates, and can distribute updated software on behalf of the developers.

As discussed further below, the key arrangement can include the use of an intermediate key that is signed by a highly-secure root key. The intermediate key, rather than the root key, is used to certify a developer's key for certifying an overall software image. This step of using the intermediate key decouples the developer's key from the root of trust somewhat, while allowing authority to be traced back to the root key. This allows the developer's key and the intermediate key to be rotated, e.g., changed, to enhance security, while still using the same public key information corresponding to the root key to validate the new versions of the intermediate key and developer's key. This flexibility to rotate the intermediate key, makes the use of the intermediate key in a networked environment acceptable. If the intermediate key were suspected to be compromised, a software update using an updated intermediate key version could be issued to cause devices to stop trusting the potentially insecure key.

In one general aspect, a method of validating software of a device includes: extracting, by the device, a public key from a secure data storage area of the device; extracting, by the device, a first certificate for an intermediate key and a second certificate for a signing key, the first certificate and the second certificate being extracted from a system image; verifying, by the device, a signature of the first certificate using the public key; after verifying the signature of the first certificate, verifying, by the device, the second certificate using a public key in the first certificate; and in response to verifying the second certificate, loading, by the device, the system image during a boot process of the device.

Implementations may include one or more of the following features. For example, in some implementations, the method includes: determining (i) a first key version number indicated by the first certificate for the intermediate key, and (ii) a second key version number indicated by the second certificate for the signing key; determining that (i) the first key version number is greater than or equal to a first minimum version number stored by the device, the first minimum version number corresponding to the intermediate key, and (ii) that the second key version number is greater than or equal to a second minimum version number stored by the device, the second minimum version number corresponding to the signing key. Loading the system image is further based on determining that (i) the first key version number is greater than or equal to the first minimum version number, and (ii) the second key version number is greater than or equal to the second minimum version number.

In some implementations, the system image includes multiple software modules each including executable code that is executed during the boot process of the device, and wherein the system image includes a signature for each of the multiple software modules. The system image includes an image-level signature generated for a collection of data that includes the signatures for the multiple software modules, the image-level signature being generated using the signing key. The method further comprises verifying the image-level signature using a public key in the second certificate. Loading the system image is further based on verifying the image-level signature using a public key in the second certificate.

In some implementations, verifying the authenticity of each of the multiple software modules based on the respective signatures for the multiple software modules. Loading the system image is further based on verifying the authenticity of each of the multiple software modules.

In some implementations, verifying the authenticity of each of the multiple software modules comprises: generating a signature for each of the multiple software modules; and comparing the generated signature for each module to the stored signature for the module that was included in a data set that was processed to generate an image-level signature.

In some implementations, the method includes: obtaining a first product identifier from a secure data storage area of the device; obtaining a second product identifier from the second certificate; and verifying that the second product identifier matches the first product identifier. Loading the system image is further based on verifying that the second product identifier matches the first product identifier.

In some implementations, the device is a phone.

In some implementations, the system image is a system image for a particular product, and wherein the system image comprises (i) multiple software modules selected by a developer, (ii) a data set including the module signatures for the multiple software modules, and (iii) a system image signature generated using a private key for the particular product, the system image signature being based on the data set including the module signatures for the multiple software modules.

In some implementations, the data set includes the module signatures and public keys corresponding to private keys used to generate the module signatures, and wherein the data set excludes the software modules.

In some implementations, the system image includes: a first certificate for a first key used to generate a second certificate for a second key; and the second certificate for the second key, where the system image signature is generated using the second key.

In some implementations, the device restricts boot of the device until the second certificate and the signature of the first certificate are verified.

In another general aspect, a method includes: identifying, by one or more computers, a product associated with a developer of the product; accessing, by the one or more computers, a private key associated with the product; receiving, by the one or more computers, data indicating multiple software modules selected by the developer; obtaining, by the one or more computers, a module signature for each of the multiple software modules; generating, by the one or more computers, a system image signature using the private key associated with the product, the system image signature being generated for a data set that includes the module signatures for the multiple software modules; generating, by the one or more computers, a system image that includes (i) the multiple software modules selected by the developer, (ii) the data set including the module signatures for the multiple software modules, and (iii) the system image signature; and providing, by the one or more computers, the system image to one or more other devices.

Implementations can include one or more of the following features. For example, in some implementations, the data set includes the module signatures and public keys corresponding to private keys used to generate the module signatures, and wherein the data set excludes the software modules.

In some implementations, the method includes providing, to a device that is an instance of the product, the system image as a software update for the device.

In some implementations, generating the system image comprises generating the system image to further include: a first certificate for a first key used to generate a second certificate for a second key; and the second certificate for the second key, wherein the system image signature is generated using the second key.

In some implementations, generating the system image comprises: determining a key version number for a current version of the first key or the second key; changing the first key or the second key; increasing the key version number for the first key or the second key; and indicating the increased key version number in the first certificate or the second certificate.

In some implementations, providing the system image to one or more other devices comprises providing the system image, over a communications network, to multiple devices each having a the product identifier corresponding to the product.

Other embodiments of these aspects include corresponding systems, apparatus, and computer programs, configured to perform the actions of the methods, encoded on computer storage devices. For instance, a system comprising one or more computers and one or more storage devices storing instructions that are operable, when executed by the one or more computers, to cause the one or more computers to perform operations.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

FIG. 6 is a flow diagram that illustrates an example of a process for validating the public key for a software image.

Like reference numbers and designations in the various drawings indicate like elements.

DETAILED DESCRIPTION

Figure 1:
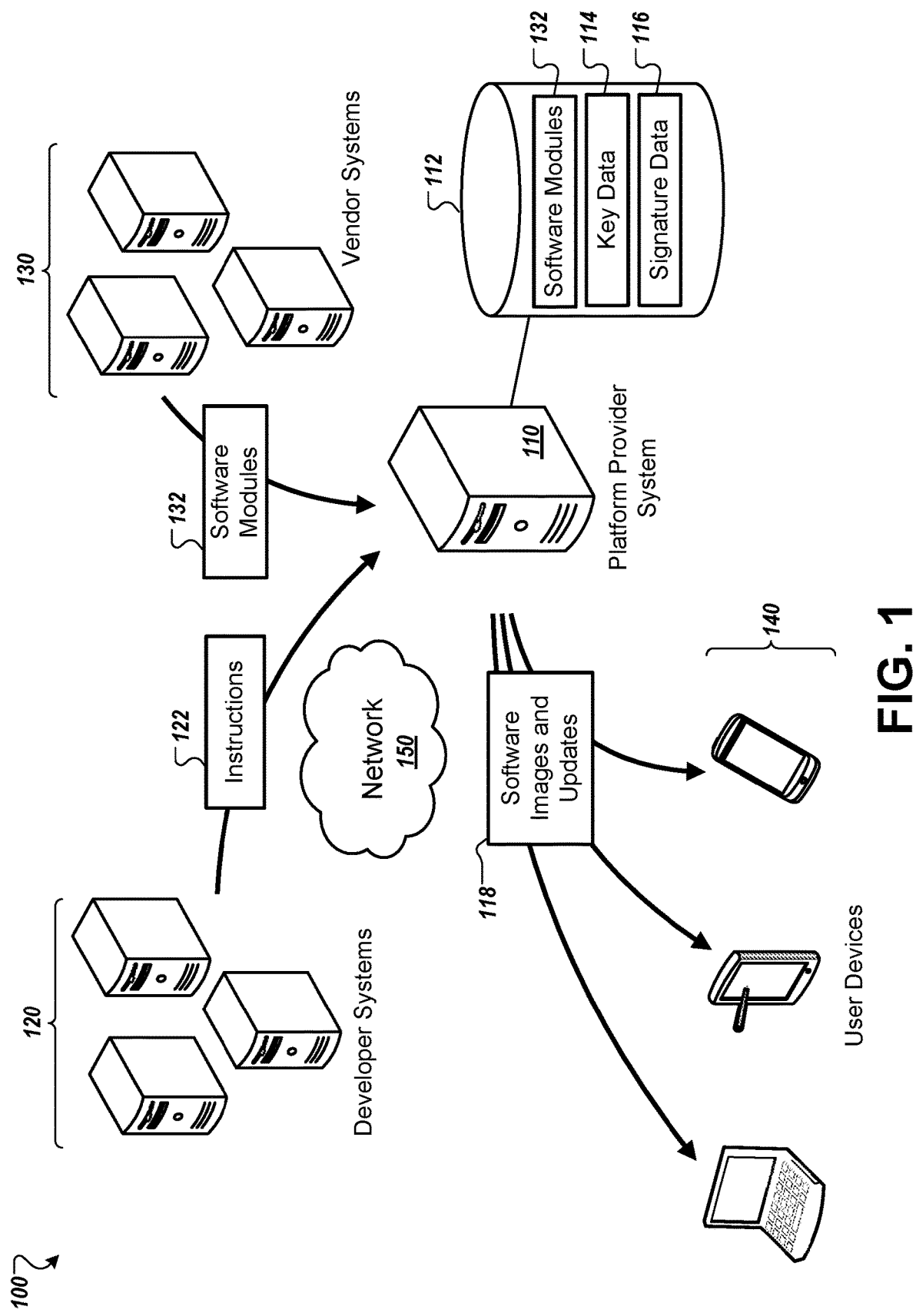
FIG. 1 is a diagram of an example system for automated signature generation for verified boot and key rotation.

The techniques in this document permit secure, scalable, multi-party verified boot of a device, and also allow secure and efficient key rotation. In some implementations, a verified boot process can be used to ensure the integrity of the software running on a device. Verified boot can ensure that all partitions with executable code are signed by the appropriate authorities before the code is executed. This process can assure a user of a device that the software has not been tampered with. In general, a key can be used to generate a signature for a software module. If the software module later changes, a device can detect that the signature is no longer valid for the changed module and the device can refuse to boot the altered module. This allows the device to guard against the execution of unauthorized or malicious software.

A platform provider can provide infrastructure that enables independent developers to create their own devices from a variety of supported hardware options. The developer can specify a customized combination of software for its device, and the platform provider can manage the signing and verification of the customized software package. For example, a developer may provide one or more application to be run, an operating system (OS) provider may provide the OS, and a hardware vendor provides OS support (e.g., driver software) and bootloaders. The platform provider builds system images for the developer and serves updates to the devices of end users. To support this process, the platform provider needs to assemble a unique verified boot stack for every version of every product, and the boot stack includes code from at least three parties, each of which have their own signing keys to sign their part of the software.

In some prior verified boot situations, only a single signature is needed for each update, and signing requires trusted employees to gather, authenticate, and generate the signature used for verification. Key rotation is generally not required if the signing key is highly secure. However, when providing a platform for many developers, manually signing updates is not feasible, and not rotating a key could compromise security. For example, the platform provider may need to regularly sign updates for dozens, hundreds, thousands, or tens of thousands of products, each of which may have a different combination of software generated from multiple code sources. For a feasible, scalable system, the signing of software packages should be automated. Similarly, key rotation and revocation should also be automated.

As discussed below, various techniques can be used to provide key protection, key rotation, and scalable automation of the signing and distribution of software. In some implementations, the platform provider system can provide an automated signing and verification system that satisfies the following requirements. First, any public key fused into device hardware has an air-gapped private key (e.g., the private key cannot be accessed via a network). Second, any private key that is not air-gapped must be rotated periodically and previous versions must be no longer trusted by devices. Third, the platform provider system should provide high availability and performance for automated signing. Fourth, the platform provider system should combine signatures from multiple parties in a manner that does not undermine other requirements.

FIG. 1 is a diagram of an example system 100 for facilitating verified boot and key rotation. System 100 includes a platform provider system 110, developer systems 120, vendor systems 130, user devices 140, and a network 150.

The platform provider system 110 provides automated key storage and signing capabilities and communicates with the other elements of the system 100 over the network 150. The platform provider system 110 provides a scalable platform for updated software to be automatically signed and distributed to the user devices 140.

The developer systems 120 represent various independent developers of electronic devices, e.g., developers of Internet-of-Things (IoT) devices. The developers use various combinations of hardware and software from vendors to create and update the user devices 140.

The vendors provide information about their software modules through the vendor systems 130. In general, the vendor systems 130 provide copies of their various software modules 132 to the platform provider system 110, which may have a database 112 or other data store of the various software modules available by the different vendors. As the vendors update their modules, the updated versions are provided to the platform provider system 110, which stores the updated modules and generates signatures for updates to be sent to the user devices 140.

In addition, the developer systems 120 interact with the platform provider system 110 to designate combinations of software modules to be included in each developer's device. For example, the platform provider system 110 can provide a user interface, e.g., through a web page or web application, or an application programming interface (API) that enables developers to send instructions 122 for creating or updating a software image. Developers may indicate specific combinations of software modules 132 that are appropriate for their respective devices. The platform provider system 110 can generate, for each type of user device 140, a product-level signature for the combination of software modules that a developer specifies. This product-level signature can demonstrate that the developer of the device 140 approves the software image, e.g., a particular combination of software modules 132, for use on the device 140.

To be able to generate signatures, the platform provider system 110 can store key data 114 and signature data 116. Each individual software module 132 can be signed, and the signature data for the module can include a corresponding signature and public key. In some instances, a vendor may provide an executable software module 132 along with the corresponding signature data. In other instances, a vendor or developer can delegate signing tasks to the platform provider system 110. As discussed below, the platform provider system 110 can generate and store private keys for vendors and developers to allow the platform provider system 110 to generate signatures for individual software modules 132 and for combinations of software modules 132 that form a software image for a user device 140.

Because the platform provider system 110 stores software modules 132 and corresponding signature data 116, the platform provider system 110 can efficiently generate software updates to send to the user device 140. In particular, since software modules 132 are signed individually, the platform provider system 110 can reuse the existing signatures for a software module 132. For example, all user devices 140 that have a common hardware platform can use the same hardware driver software module, with the same signature generated using the hardware vendor's private key. This module can serve as one of the building blocks that different developers use to generate their own system images. Each developer may add, to the hardware driver software module, an operating system and other software. Then each developer instructs the platform provider system 110 to sign its own combination of software modules with the developer's unique private key. The platform provider system 110 stores the developer private keys in the key data 114, allowing the platform provider system 110 to sign on behalf of any of the developers, and for any of a developer's products.

The platform provider system 110 then packages the resulting signed images 118 for distribution to the user devices 140. The platform provider system 110 can provide each user device 140 the software image corresponding to its product identifier. The software can be provided as complete images, as incremental updates, or in other forms. The software image for a particular product can be provided to all instances of that product, e.g., thousands of devices with the same model number or product identifier can receive the same updated software image.

As discussed below, for enhanced security, the private keys used to sign the software modules 132 and the images 118 can be rotated, e.g., changed periodically. The keys for vendors, developers, and others can all be rotated independently. In other words, the keys used to sign individual modules and/or the entire image can be changed together or at different times. In addition, each of the user devices 140 can implement techniques to ensure that signatures using earlier key versions are no longer accepted.

As part of the key rotation process, the platform provider system 110 generates a new image 118 that uses one or more updated keys. The image 118 indicates the new version codes, e.g., version numbers, for the keys. When a user device 140 receives the updated image and verifies the contents, the user device 140 updates a local value in tamper-proof storage to indicate the new version code. Part of the boot process for the user device 140 includes checking the key version code against the stored version code to verify that the key used is current. During boot, if the user device 140 determines that a software module 132 is signed using an outdated key, the user device 140 may block execution of the software module or terminate the boot process to avoid running software that is potentially unsafe.

Figure 2:
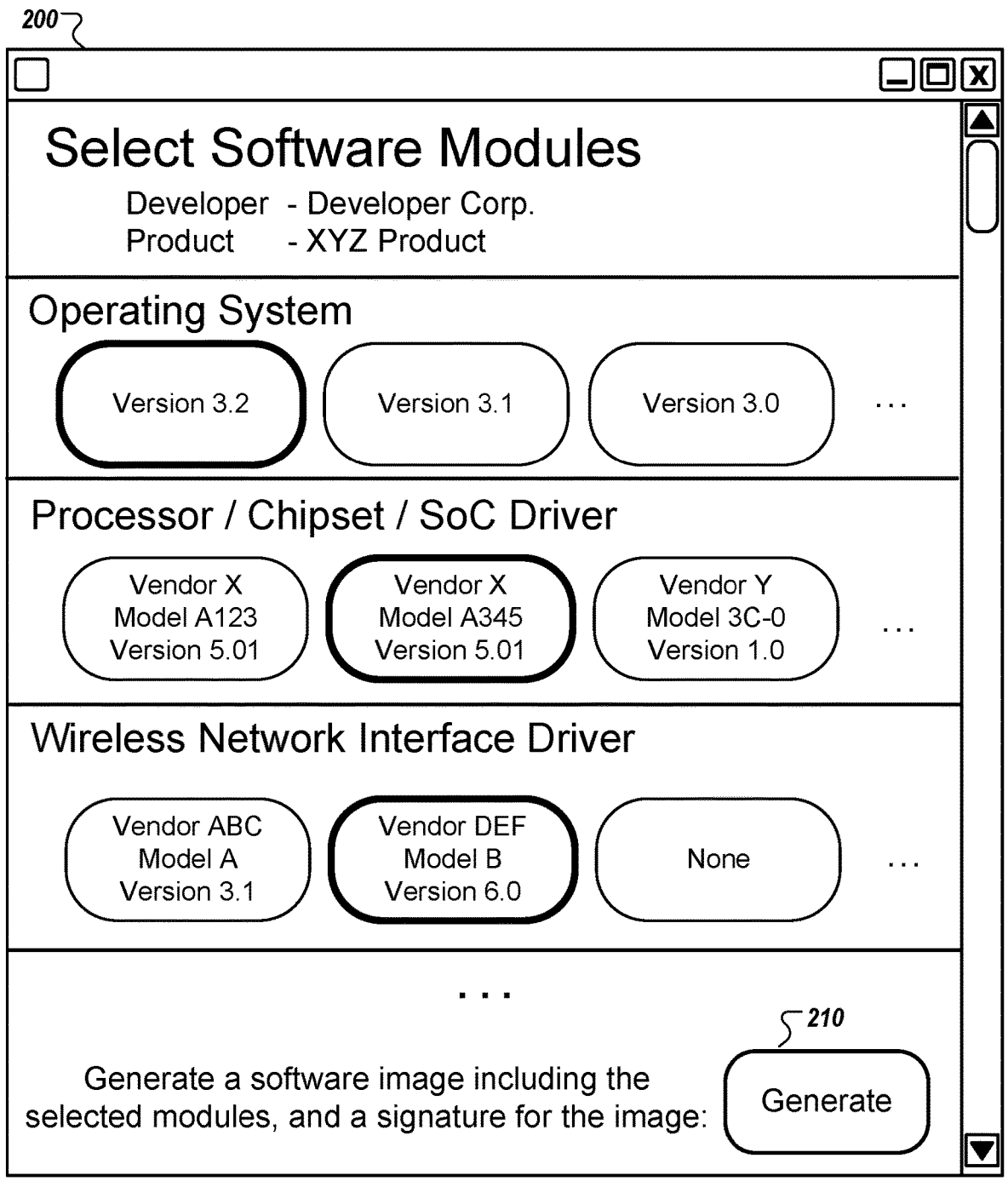
FIG. 2 is a diagram of an example of a user interface for facilitating generation of software images and signatures.

FIG. 2 is a diagram of an example of a user interface 200 for facilitating generation of software images and signatures. The user interface 200 shows options for a developer ("Developer Corp.") to select software modules to include in a software image for a particular product ("XYZ product").

In the example, the developer can select among several different versions of an operating system. The developer can also select hardware drivers from among drivers from different vendors, hardware models, and driver versions. In some implementations, the platform provider system 110 may store information about the hardware of the particular product, and filter the options to the appropriate vendor and hardware, allowing the developer to select from among different versions or packages for that hardware. The user interface 200 also shows options to select from different wireless network interface drivers, e.g., for different vendors, hardware models, or software versions of drivers. Other types of software can be selected, in addition to or instead of the types of software illustrated. The developer may also select one or more modules that the developer has uploaded for use in the particular product.

After the developer has selected the desired set of software modules, the developer can instruct the platform provider system 110 to generate the software image and appropriate signatures, e.g., by selecting control 210. The platform provider system 110 retrieves the selected software modules, and also places information about their corresponding signatures in a verified boot metadata ("vbmeta") partition that is included in the software image. The vbmeta partition may include, among other data, a list of each of the approved modules, along with their corresponding signatures and public keys. These signatures for individual modules may have been generated by the platform provider system 110 or by the party that provided the module. The platform provider system 110 generates an image-level or system-level signature by signing the vbmeta partition with the developer's key. This signifies that the developer approves the combination of software modules in the image to be loaded on the particular product during boot. The platform provider system 110 then provides the software image, with signature, to the developer or can distribute the image directly to the devices that are instances of the particular product.

In some implementations, the developer may specify that the developer's key should be changed to a new version. If the developer does so, platform provider system 110 generates a new developer key as discussed below and increments the version number. If any of the selected modules are signed with a new version of their corresponding keys, the signatures that the platform provider system 110 retrieves will include the up-to-date signature data generated with the new keys. When the image is received by a user device, the user device will increment stored values indicating the minimum key version that is acceptable, so that modules signed with outdated keys are not executed.

Figure 3:
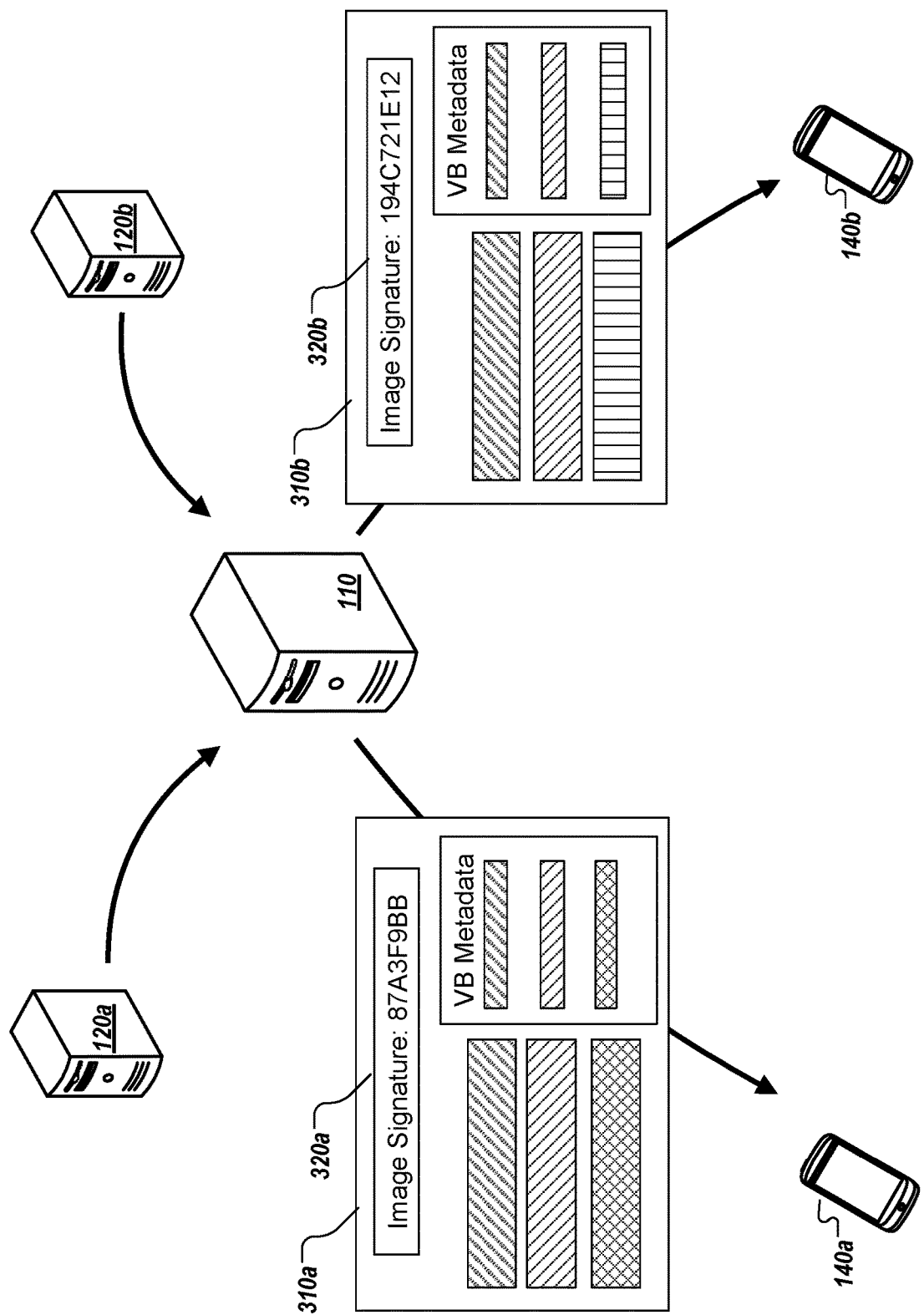
FIG. 3 is a block diagram illustrating an example of a system for providing

FIG. 3 is a block diagram illustrating an example of a system 300 for providing software images to user devices. In the example, the platform provider system 110 receives instructions from one developer system 120a about an image for a user device 140a. The platform provider system 110 also receives instructions from a different developer system 120b about an image for a user device 140b.

The platform provider system 110 generates different software images 310a, 310b for the different devices 140a, 140b. In the example, each software image 310a, 310b includes three software modules. Each software image 310a, 310b also includes a vbmeta partition that has signature data for each of the included modules.

When generating the software images 310a, 310b, the platform provider system 110 can reuse the existing module code and stored signature data. Unless the key for a module becomes outdated, the stored signature data need not be recomputed for a module. In the example, the first two modules are shared between the images 310a, 310b. For these shared modules that are shared, the platform provider system 110 includes the same signature data in the vbmeta partitions. For the third module in the software images 310a, 310b, the developers chose different modules, and the platform provider system 110 accordingly chooses different modules and the corresponding signatures. After the vbmeta partitions are completed, the platform provider system 110 signs each vbmeta partition to generate an image-level signature 320a, 320b. The signature for each software image 310a, 310b is generated using the unique private key of the developer causing the image to be created. As a result, even if two developers selected the same combination of software modules, the signatures for the images would be different due to the use of different developer keys to generate the image-level signatures for the images.

The various signing keys and signatures used in generating software images are discussed further below. It is important that verified boot be extremely scalable, meaning that the platform can scale to serve many developers and products in an automated way. This can be achieved with a set of asymmetric keys in the verified boot signing and verification processes that allows the platform to meet both security and scalability requirements. With these keys, the platform separates the product root key (PRK) from the system signing key (SSK), allowing these keys to be given to other parties to use in a more scalable manner.

Four main keys are used by the platform provider system 110 to generate the signatures, a Product Root Key (PRK), a Product Intermediate Key (PIK), a Product Signing Key (PSK), and a System Signing Key (SSK). In some implementations, different instances of these keys can be used for different developers or products. For example, there may be multiple different PSKs, e.g., one per product per developer. Thus, to support a developer with 5 products, the platform provider system 110 may use 5 PSKs at a time, with a different PSK for each product. The PSKs may be unique to each product, so that a PSK for one developer's product is not also used for other products of the developer or products of any other developer.

In some implementations, a SSK is used by the platform provider system 110 for a particular hardware platform. As a result, if two developers develop products using the same hardware platform, the same SSK may be used even though the PSKs and other information may differ for the different products. This can allow efficient use of modules and signature data for software, such as operating systems, that are used in many different products for many different developers.

In some implementations, the PRK and PIK may be shared for different developers and/or products. For example, a single PRK may be used as the root of trust for multiple products of a developer and/or multiple products of different developers. Similarly, at a given time, a single PIK may be used for multiple products of a developer and/or multiple products of different developers. Nevertheless, different PRKs can be used for different products or developers. Similarly, products associated with the same PRK may be associated with different PIKs. For example, a set of different product models that are all associated with the same PRK may be separated into different groups, where each group is associated with a different PIK. In some instances, a PIK may be used only for products of a single developer, or for only a specific product.

In addition to the keys used by the platform provider system, other keys from other software providers (e.g., hardware vendors) may also be at used by those software providers. For example, vendors can maintain their own keys independent of the platform provider system 110 and generate their own signatures. Then, vendors can provide software modules with corresponding signatures and public keys. Even without knowledge of the keys used by the vendors, the platform provider system can use the those signed modules in the arrangement discussed herein to allow verification of the modules during boot.

The keys used by the platform provider system 110 are described in Table 1 below.

TABLE 1

| Key | Name | Description |
|-----|------|-------------|
| PRK | Product Root Key | The PRK is the root of trust for all products and is the same for all products. The PRK private key is held by the platform provider in a secure offline facility. The PRK private key is only used to sign PIKs and is never rotated. It is acceptable to fuse the PRK public key into user device hardware. |
| PIK | Product Intermediate Key | PIK private keys are protected by platform provider key storage infrastructure and are accessible only to the Verified Boot Certificate Authority, which is represented by the platform provider system 110. In practice, there is only one PIK active for a product at one time and it is rotated occasionally (e.g., annually). PIK public keys must never be fused into hardware or otherwise considered a root of trust. The Verified Boot Certificate Authority, e.g., the platform provider system 110, uses PIKs to certify PSKs. |
| PSK | Product Signing Key | PSK private keys are held by platform provider key storage infrastructure and are accessible only to developers. There is always one PSK private key active at one time for each product and it is rotated regularly (e.g., 90 days). PSK public keys must never be fused into hardware or otherwise considered a root of trust. The developers use PSKs to sign vbmeta content for the associated product, as well as to sign product-specific partitions. |
| SSK | System Signing Key | SSK private keys are protected by platform provider key storage infrastructure and are accessible only to the platform provider. There is only one SSK active at one time for each supported hardware platform. They can be rotated regularly (e.g., 90 days). SSK public keys must never be fused into hardware or otherwise considered a root of trust. The platform provider uses SSKs to sign software images specific to a hardware platform but common to multiple products, for example, an operating system. The SSK public key is placed in the vbmeta partition in the descriptors for the partitions it has signed. |

Each of the four keys described in Table 1 describes a private key that is part of an asymmetric encryption scheme. Each key may represent the private key of an RSA public-key cryptosystem.

Figure 4:
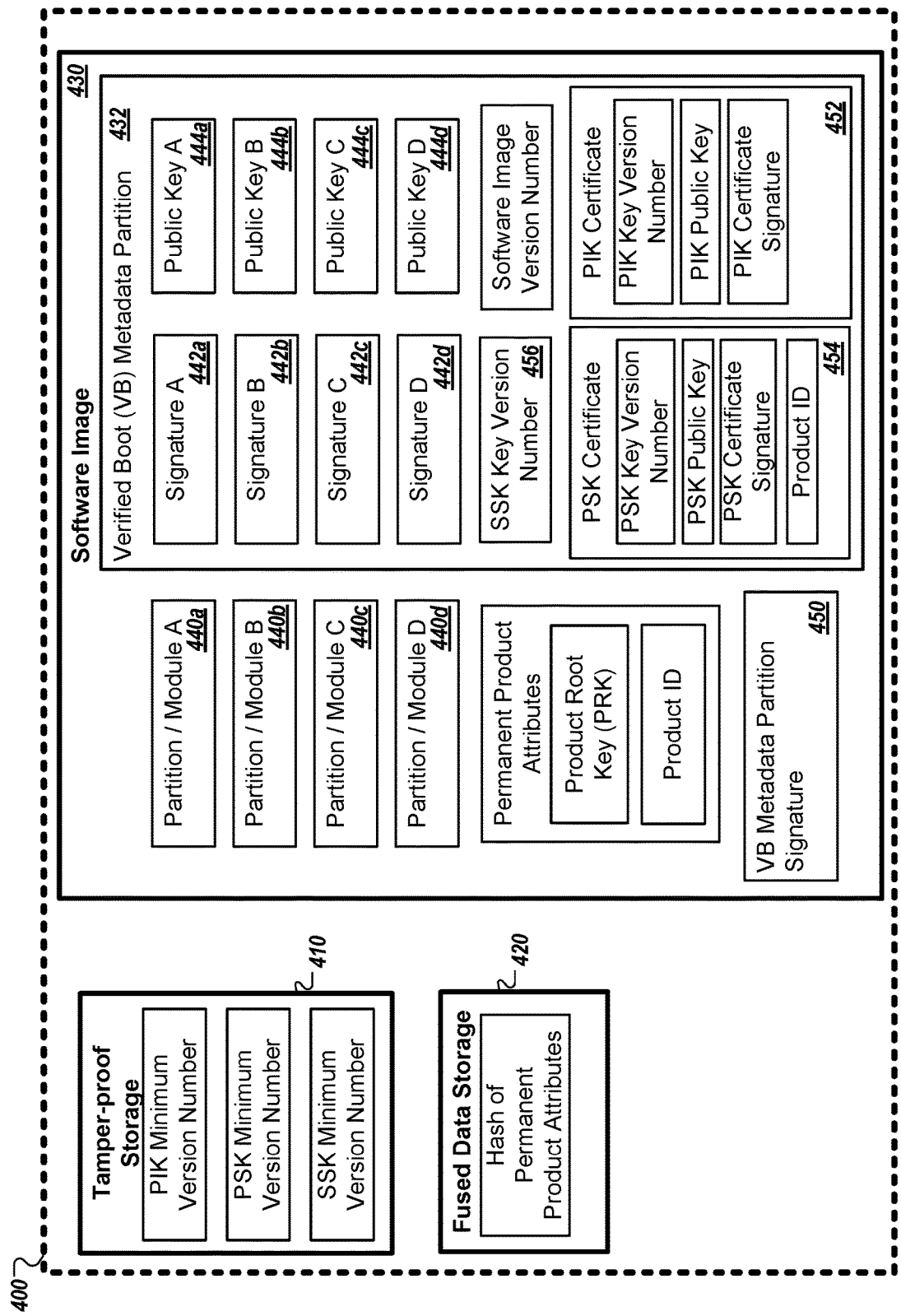
FIG. 4 illustrates an example of data storage at a user device, including data used for verified boot.

FIG. 4 illustrates an example of data storage at a user device 140, including data used for verified boot. The example shows three main types of storage: (1) tamper-proof storage 410, (2) fused storage 420, and (3) general storage, which includes a software image 430.

The tamper-proof storage 410 is a non-volatile data storage area or device. The user device 140 can write to this area, but writing is restricted so that the operating system of the device cannot write to it. For example, writing may be possible only during only a particular portion of the boot process that ends before control is passed to the operating system. The tamper-proof storage 410 stores the minimum version number for each of several keys. These values can include, e.g., a PIK minimum version number, a PSK minimum version number, and an SSK minimum version number. As the user device 140 receives modules that include new key versions, the user device 140 increases the stored minimum version numbers to equal the current key version. Each of the PIK, PSK, and SSK can be changed independently, as can the corresponding version numbers.

The fused storage 420 stores data that is generally not writable under normal operation. For example, the fused storage 420 may encode data in fuses, ROM, write-protected flash, or other storage. The data in the fused storage 420 is typically not changed over the life of the product. The fused storage 420 can also include a hash of permanent product attributes that can be used to verify that the permanent product attributes obtained from other storage are correct. Typically, a hash of permanent product attributes is stored in fuses to limit fuse consumption, rather than specifying product attributes directly with fuses. However, in some instances, the product attributes may be specified using fuses instead of indicating a hash. In the example of FIG. 4, permanent product attributes, including the product identifier and the PRK public key, are specified outside the fused storage 420, and a hash of this information is stored in the fused storage 420.

The general storage area stores a software image 430. This image includes several software modules 440a-440d, each of which may be stored in a different partition. The software image 430 also includes a verified boot metadata ("vbmeta") partition 432 that identifies each of the modules 440a-440d in the software image 430 and also includes descriptors for verifying the various modules 440a-440d. The descriptor for a module includes information that allows the device 140 to verify, for example, that the module is authentic. In the example, each module 440a-440d has a corresponding signature 442a-442d and public key 444a-444d in the vbmeta partition 432. For example, the public key 444a for the module 440a is the public key that corresponds to the private key used to generate the signature 442a for the module 440a. The vbmeta partition 432 can indicate the beginning and end of each module 440a-440d and which signature 442a-442d and public key 444a-444d corresponds to each module 440a-440d. The vbmeta partition 432 may include other information in addition or as an alternative.

The vbmeta partition 432 can also include other information that is used to verify the validity of the software image. For example, the vbmeta partition 432 can also include certificates and other information for verifying the validity of a signature 450 for the vbmeta partition 432, keys used, or other components of the software image 430. The software image 430 may include a PIK certificate 452 for the Product Intermediate Key (PIK). The PIK certificate 430 can include a PIK Key version number indicating the version of the PIK used when generating the image 430. The PIK certificate 452 also includes a PIK public key corresponding to the PIK. The PIK certificate 452 also includes a PIK certificate signature, e.g., a signature generated from the other contents of the certificate that can be used to endorse the PIK certificate. The PRK is used to generate the signature for the PIK certificate.

The vbmeta partition 432 can include a PSK certificate 454, which includes a PSK version number indicating the version of the Product Signing Key (PSK) used to generate the image 430. For example, this can be the version number for the PSK used to generate the signature 450. The PSK certificate 454 includes a PSK public key corresponding to the PSK. The PSK certificate 454 includes a product identifier that indicates the product to which the PSK corresponds. The device 140 can compare this product identifier to the product identifier in the fused storage 420. If the two identifiers match, the image 430 is intended for the device 140. If the identifiers do not match, the image and the PSK are for a different product, and so the device 140 can determine that the image 430 is not appropriate for the device 140. The PSK certificate 454 includes a PSK certificate signature, e.g., a signature generated from the other contents of the certificate that can be used to endorse the PSK certificate. The PIK is used to generate the signature for the PSK certificate.

Other certificates and verification data can be included. A SSK key version number 456 can be included in the vbmeta partition 432. In some implementations, a SSK certificate, similar to the PIK certificate, can be included so that a SSK public key and SSK certificate signature are also included. Generally, the SSK is used to sign one or more of the modules 440a-440d, and so the SSK public key can be one or more of the public keys 444a-444d.

The certificates 452, 454 and version information 456 can be stored in the vbmeta partition 432 as discussed above. Alternatively, in some implementations, the certificates 452, 454 and version information 456 can be stored outside the vbmeta partition 432 and can be signed separately from the vbmeta partition 432.

The software image 430 can also include other information that is used to verify the validity of the software image. This information includes a vbmeta partition signature 450. This signature is generated using the PSK, one of the developer's private keys for the product. Signing the vbmeta partition 432 ensures that modules 440a-440d cannot be added, removed, or replaced without rendering the signature 450 invalid. Similarly, the inclusion of the certificates 452, 454 and version number information 456 allows these to be verified using the signature 450. Further, since the vbmeta partition 432 includes signatures 442a-442d for each module 440a-440d, individual modules 440a-440d cannot be altered without rendering the signatures 442a-442d invalid. This arrangement also permits the flexibility for the provider of each module to use their own signing key. For example, hardware vendors and software vendors may use their own keys for signing, independent of the platform provider system 110 and simply provide the signatures, private keys, and modules. Alternatively, some vendors may delegate some signing authority to the platform provider system 110 to generate signatures for modules. When authority is given to the platform provider system 110, the platform provider system 110 can automatically sign each update for a module as well as rotate signing keys automatically.

Figure 5:
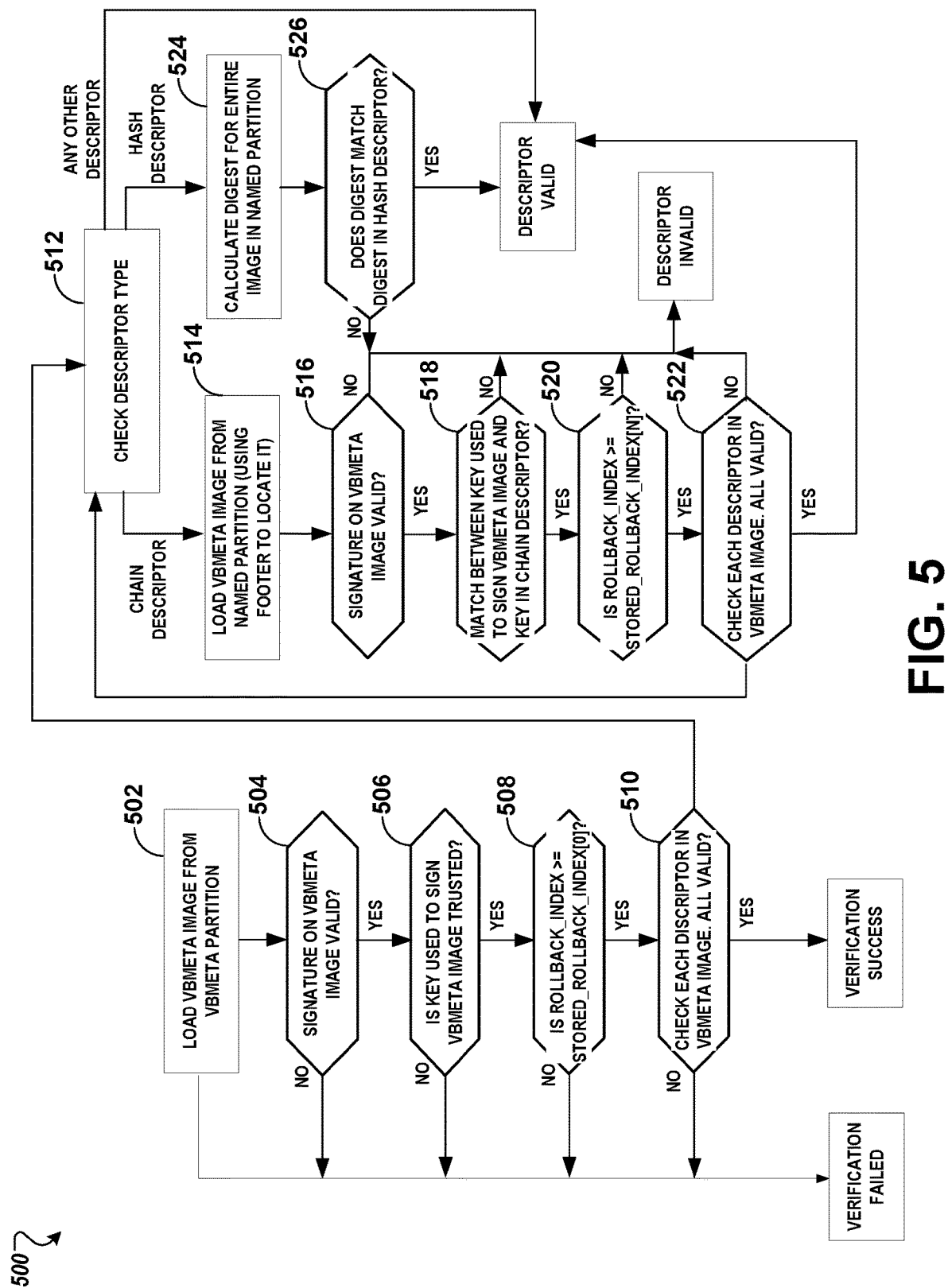
FIG. 5 is a flow diagram illustrating an example of a process for verified boot.

FIG. 5 is a flow diagram illustrating an example of a process 500 for verified boot. The steps shown in FIG. 5 are performed by a device, such as one of user devices 140, each time the device is booted to verify the integrity of the installed software. The steps may be performed by a bootloader or other software that runs at the time of boot.

In step 502, the bootloader loads the vbmeta image from the vbmeta partition 432.

In step 504, the bootloader determines whether the signature 450 on the vbmeta partition 432 is valid.

In step 506, the bootloader determines if the key used to sign the vbmeta partition 432 is trusted.

In step 508, the bootloader determines if a rollback index value is greater than or equal to a stored rollback index value. In some implementations, each software image, e.g., image 430, includes a version code for the index. The developer can use this version code to designate update in sequence. A device 140 can store a version code for the software image, e.g., in tamper-proof storage, to verify that the image being loaded is at least as high as the stored index. In this manner, the device 140 can detect if the image being booted represents an outdated image, which may represent an attempt by an attacker to roll back to a prior, insecure version. If the version number of an image is higher than the stored version number, and the image is otherwise determined to be valid, then the device 140 can allow the image to be booted and also can update the stored version number to the current version.

If any of the determinations in steps 504, 506, 508 fail to indicate that the image is current and valid, then the bootloader indicates that verification as failed, and further checks can be omitted.

In step 510, the bootloader checks the descriptors for each software module in the software image 430, and determines whether the respective modules are valid. The process of validating descriptors is show in steps 512-526.

In step 512, the bootloader checks the descriptor type of a software module in the image 432. If a chain descriptor is used, the bootloader proceeds with steps 514-522. If a hash descriptor is used the bootloader proceeds with steps 524 and 526.

In step 514, the bootloader loads verified boot metadata from within the partition for a particular module 440a-440d. This metadata is referred to below as module-specific vbmeta data, as opposed to the data in image-level vbmeta partition 432. Some partitions can include their own vbmeta images, for example, if the module is itself a compilation of other modules. In this manner, multiple levels of signatures can be used, or the vbmeta partition 432 for an image 430 can point to a module-specific vbmeta partition within a particular module 440a-440d in the image 430.

In step 516, the bootloader verifies the signature on the module-specific vbmeta image within a particular module.

In step 518, the bootloader determines if there is a match between the key used to sign the module-specific vbmeta image and a public key in the chain descriptor within the image-level vbmeta partition 432.

In step 520, the bootloader determines whether a rollback index for the module is greater than or equal to a stored rollback index. The stored rollback index can be obtained from the chain descriptor, e.g., from the data in the image-level vbmeta partition 432.

In step 522, the bootloader checks each descriptor in the module-specific vbmeta image. This allows the bootloader to verify each component of the module being examined.

If any of the verification steps 516-522 give a negative result, then verification for the module fails. If all of the verification steps 516-522 give a positive result, then verification for the module succeeds.

If a hash descriptor is used for a module, then in step 524, the bootloader calculates a digest for the entire image in the partition for the module. For example, the bootloader may generate a hash or other digest from the partition.

In step 526, the bootloader determines whether the computed digest matches a digest in the hash descriptor. If the digests match, the module is considered to be valid, and if the digests do not match the verification fails.

The bootloader performs verification steps for each module 440a-440d in the software image 430. After performing the other verification steps, if all of the modules are successfully verified, then the bootloader determines that the software image 430 is authentic, intact, and appropriate for the device 140 that it is being loaded on. The bootloader proceeds to boot the device 140 and runs the executable code in each module 440a-440d as needed to carry out the boot process.

FIG. 6 illustrates an example of a process 600 for validating the public key for a software image. The process 600 can be performed as part of step 506 in the process 500 of FIG. 3, to determine if the public key corresponding to the Product Signing Key (PSK) used to sign the vbmeta partition 432 is trusted. The process 600 may thus be performed by a user device 140, e.g., by the bootloader or another validation mechanism.

Briefly, the process 600 involves reading a PRK public key, e.g., from protected storage on the device 140, e.g., fused data storage 420, and verifying the authenticity of the PRK public key. The process 600 also involves reading other information, e.g., (1) reading minimum version values for the PIK, PSK, and SSK from the tamper-proof storage 410, and (2) extracting certificate data or other verification data for the PIK, PSK, and SSK from the software image 430. The process 600 then verifies the PIK public key and PSK public key. The versions for the PIK, PSK, and SSK are also verified to ensure that the proper version was used. The steps of the process 600 can be performed in the sequence shown.

In step 601, the device 140 reads the Permanent Product Attributes from the fused data storage 420 and extracts the PRK Public Key and the Product ID. In some implementations, RSA asymmetric encryption is used, in which the modulus is one of the parameters of the public key.

In step 602, if the Permanent Product Attributes are not stored in fused storage, the device 140 hashes the Permanent Product Attributes and verifies the result against the fused hash. A match verifies that the extracted public key and product identifier are valid for the device 140.

In step 603, the device 140 reads the PIK, PSK, and SSK minimum version values from tamper-proof storage 410.

In step 604, the device 140 extracts the PIK Certificate 452, PSK Certificate 454, and SSK version number 456 from the vbmeta partition 432 from the image 430.

In step 605, the device 140 verifies the PIK Certificate signature using the PRK public key. In some instances, the modulus of the PRK public key is used for this verification.

In step 606, the device 140 verifies the PIK Certificate usage. This may involve determining that the issuer of the certificate authorized or intended the key to be used as a PIK. An indicator in the signed portion of the PIK certificate can indicate whether the certificate authority that issued the certificate intended that the key was to be used as a PIK.

In step 607, the device 140 verifies the PIK Certificate key version against the PIK minimum version.

In step 608, the device 140 verifies the PSK Certificate using the PIK public key in the PIK Certificate.

In step 609, the device 140 verifies the PSK Certificate subject (e.g., the product identifier in the PSK certificate 454) against the actual product identifier for the device 140 (e.g., from the Permanent Product Attributes).

In step 610, the device 140 verifies the PSK Certificate usage. This may involve determining that the issuer of the certificate authorized or intended the key to be used as a PSK. An indicator in the signed portion of the PSK certificate can indicate whether the certificate authority that issued the certificate intended that the key was to be used as a PSK.

In step 611, the device 140 verifies the PSK Certificate key version against the PSK minimum version.

In step 612, the device 140 verifies that the PSK public key in the PSK Certificate 454 matches the public key obtained from step 506 in FIG. 5. The vbmeta partition 432 stores the public key that can be used to verify the PSK public key. This process makes sure the PSK public key used by the process in FIG. 5 matches the public key stored in the PSK certificate.

In step 613, the device 140 verifies the SSK version (from public key metadata) against the SSK minimum version. Since the SSK version information is signed by the PSK, this step needs to happen after the PSK trust decision, otherwise the SSK version is not known to be valid.

After step 613, with the device 140 having verified the integrity of each of the certificates, the usage of the certificates, and the version numbers for each of the relevant keys, the device 140 determines that the current image is intact and can proceed to boot the device 140. However, if any of the verification steps 605-613 fails, e.g., indicates a difference from the expected values, the device 140 may block booting to avoid operating using insecure software. Similarly, if the values needed to perform the verification steps cannot be accessed, or if the permanent product attributes are not successfully verified in step 602, the device 140 may refuse to boot.

As shown above, the process 600 verifies each of the version numbers of the PIK, PSK, and SSK. These keys may be rotated, and so the device 140 implements a hardware-assisted protection scheme to ratchet forward the stored version numbers as new keys are used. Reducing the version numbers is not allowed.

The PRK is not rotated. In other words, the PRK and its corresponding public key are used for the life of the device 140. The PRK is only used to sign PIKs, which in turn are used to certify PSKs. This allows significant flexibility to automate signing and also rotate the PIKs and PSKs.

The use of the PIK to certify a PSK, rather than using the PRK to sign a PSK, is one of the portions of the arrangement that enhances security. By using the PRK to sign PIKs, the device 140 may verify that any PIK is authentic using the fused storage of the PRK public key. The PIK in turn can certify that any appropriate PSK is valid. Since the PIK is not fused into the device 140, it can be rotated. This also makes security of the PIK less critical than the PRK. If the PRK were compromised, the other keys that depend on the device 140 could be compromised, and there would not be a way to change to a new version. If the PIK were compromised, an update with a new PIK version can be issued, which would render the compromised version of the PIK no threat to the updated devices 140. This ability to update the PIK while performing the other signing functions makes the PIK suitable for storage in a networked platform, e.g., the platform provider system 110, where the PIK can be used to sign PSKs in an automated manner. The PRK can be kept in an "air-gapped" or offline facility to reduce the risk of it being obtained.

Key rotation occurs periodically as a matter of good practice and can also occur on demand in response to suspected unauthorized access. All keys with the exception of the PRK are subject to rotation. Every rotation implies revocation of the old key. Devices use rollback protection for each type of rotatable key to ensure revoked keys are not trusted.

Each individual device implements key rollback protection. Each PIK, PSK, and SSK public key stored on a device is paired with a version number, e.g., a 32-bit integer, a 64-bit integer, etc. The device also maintains minimum version values for each of these stored in a location that is tamper-proof for the main OS. During boot, the minimum key version is compared to the booting key version for each key and the boot is aborted if a booting key version is smaller than the minimum. Each time an OS update is verified as good by the bootloader, all the minimum key versions are updated to the values specified in the OS update. The key versions are distinct and independent from software image rollback versions. Software image version rollback protection can also be performed alongside key rollback protection.

To rotate a PIK, the following process can be used. First, the signing party assembles to witness entire process, including CA commands. Second, a CA command is issued which generates a new RSA key pair and exports a partial certificate which contains all information except the signature field. The key version for the PIK is incremented. Third, the partial certificate is copied to portable media (e.g., a flash drive) which accompanies the signing party to the PRK secure facility. Fourth, the signing party authenticates to the secure facility and HSM using an M-of-N scheme. Fifth, a HSM command is issued to generate a signature for the partial certificate. Sixth, a signature is appended to the partial certificate to form a complete certificate for the PIK. Seventh, the signing party departs from the secure facility. Eighth, a CA command is issued which imports the new certificate. Ninth, a CA command is issued which initiates the rollover to the new key and certificate.

The process of rotating a PSK is discussed below. The process for rotating a PSK is automated and executed by developers. Signers maintain a Time-To-Live (TTL) value and certificate for each PSK. When a signer receives a request to sign with an expired PSK (or a PSK that does not yet exist), the rotation is executed synchronously. If the PSK has not expired, but soon will, the signer initiates the rotation asynchronously. The steps for rotating a PSK are as follows: (1) The signer generates a new key pair, a TTL value, and a partial certificate in which the key version is incremented. (2) The signer sends a request to the certificate authority to sign the partial certificate. (3) The certificate authority validates partial certificate, signs it, and emits the complete certificate. (4) The signer initiates rollover to the new key and certificate. In some implementations, the role of signer and certificate authority are both performed by the platform provider system. For example, the platform provider system 110 acts as the certificate authority, and also acts to perform signing on behalf of developers.

SSK rotation is automated and executed entirely by the developers. Signers maintain a Time-To-Live (TTL) value and a key version for each SSK and execute synchronous or asynchronous rotations like for PSKs. Since there is generally no certificate for a SSK, the process is simply steps (1) and (4) from PSK rotation. First, the signer generates a new key pair, TTL value, and increments the key version. Second, the signer initiates rollover to the new key.

In the process for rotating a PSK discussed above, data that would normally be maintained by a developer can be stored and maintained by the platform provider system 110. In some implementations, the SSK is controlled by the platform provider, not a developer or vendor. For example, the platform provider system 110 can store, for each product of each developer, data indicating the current PIK, PSK, and SSK, as well as corresponding certificates, public keys, version numbers and so on. The platform provider system 110 can automatically determine, for example, that a key has expired or will expire within a threshold amount of time, and in response may generate and distribute an update using updated key versions. In some implementations, developers may specify on demand that key versions should be updated, and the platform provider system 110 uses new key versions in the next update in response.

A number of implementations have been described. Nevertheless, it will be understood that various modifications may be made without departing from the spirit and scope of the disclosure. For example, various forms of the flows shown above may be used, with steps re-ordered, added, or removed.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Particular embodiments of the invention have been described. Other embodiments are within the scope of the following claims. For example, the steps recited in the claims can be performed in a different order and still achieve desirable results.

What is claimed is:

1. A method of validating software of a device, the method comprising:
   extracting, by the device, a public key from a secure data storage area of the device;
   extracting, by the device, a first certificate for a public intermediate key and a second certificate for a public signing key, the first certificate and the second certificate being extracted from a system image that is for a particular product, the system image comprising multiple software modules, a data set including module signatures for the multiple software modules, and a system image signature generated using a private key for the particular product, the system image signature being based on the data set including the module signatures for the multiple software modules;
   verifying, by the device, a signature of the first certificate using the public key;
   after verifying the signature of the first certificate, verifying, by the device, the second certificate using the public intermediate key in the first certificate; and
   in response to verifying the second certificate, loading, by the device, the system image during a boot process of the device.

2. The method of claim 1, further comprising:
   determining (i) a first key version number indicated by the first certificate for the public intermediate key, and (ii) a second key version number indicated by the second certificate for the public signing key;
   determining that (i) the first key version number is greater than or equal to a first minimum version number stored by the device, the first minimum version number corresponding to the public intermediate key, and (ii) that the second key version number is greater than or equal to a second minimum version number stored by the device, the second minimum version number corresponding to the public signing key; and
   wherein loading the system image is further based on determining that (i) the first key version number is greater than or equal to the first minimum version number, and (ii) the second key version number is greater than or equal to the second minimum version number.

3. The method of claim 1, wherein the multiple software modules each include executable code that is executed during the boot process of the device;
   wherein the system image includes an image-level signature generated for a collection of data that includes the module signatures for the multiple software modules, the image-level signature being generated using a private signing key;
   wherein the method further comprises verifying the image-level signature using the public signing key in the second certificate; and
   wherein loading the system image is further based on verifying the image-level signature using the public signing key in the second certificate.

4. The method of claim 3, further comprising verifying authenticity of each of the multiple software modules based on the respective module signatures for the multiple software modules,
   wherein loading the system image is further based on verifying the authenticity of each of the multiple software modules.

5. The method of claim 4, wherein verifying the authenticity of each of the multiple software modules comprises:
   generating a signature for each of the multiple software modules; and
   comparing the generated signature for each module to a stored signature for the module that was included in the data set that was processed to generate the image-level signature.

6. The method of claim 1, further comprising:
   obtaining a first product identifier from a secure data storage area of the device;
   obtaining a second product identifier from the second certificate; and
   verifying that the second product identifier matches the first product identifier;
   wherein loading the system image is further based on verifying that the second product identifier matches the first product identifier.

7. The method of claim 1, wherein the device is a phone.

8. The method of claim 1, wherein the data set includes the module signatures and public keys corresponding to private keys used to generate the module signatures, and wherein the data set excludes the software modules.

9. The method of claim 1, wherein the system image includes:
   a first certificate for a first key used to generate a second certificate for a second key,
   wherein the system image signature is generated using the second key.

10. The method of claim 1, further comprising restricting boot of the device until the signature of the second certificate and the signature of the first certificate are both verified.

11. A device comprising:
    one or more processors; and
    one or more non-transitory computer-readable media storing instructions that, when executed by the one or more processors, cause the one or more processors to perform operations comprising:
      extracting, by the device, a public key from a secure data storage area of the device;
      extracting, by the device, a first certificate for a public intermediate key and a second certificate for a public signing key, the first certificate and the second certificate being extracted from a system image that is for a particular product, the system image comprising multiple software modules, a data set including module signatures for the multiple software modules, and a system image signature generated using a private key for the particular product, the system image signature being based on the data set including the module signatures for the multiple software modules;
      verifying, by the device, a signature of the first certificate using the public key;

after verifying the signature of the first certificate, verifying, by the device, the second certificate using the public intermediate key in the first certificate; and in response to verifying the second certificate, loading, by the device, the system image during a boot process of the device.

12. The device of claim 11, wherein the operations further comprise:

determining (i) a first key version number indicated by the first certificate for the public intermediate key, and (ii) a second key version number indicated by the second certificate for the signing key;

determining that (i) the first key version number is greater than or equal to a first minimum version number stored by the device, the first minimum version number corresponding to the public intermediate key, and (ii) that the second key version number is greater than or equal to a second minimum version number stored by the device, the second minimum version number corresponding to the public signing key; and wherein loading the system image is further based on determining that (i) the first key version number is greater than or equal to the first minimum version number, and (ii) the second key version number is greater than or equal to the second minimum version number.

13. The device of claim 11, wherein the multiple software modules each include executable code that is executed during the boot process of the device;

wherein the system image includes an image-level signature generated for a collection of data that includes the module signatures for the multiple software modules, the image-level signature being generated using a private signing key;

wherein the operations further comprise verifying the image-level signature using the public signing key in the second certificate; and wherein loading the system image is further based on verifying the image-level signature using the public signing key in the second certificate.

14. The device of claim 13, wherein the operations further comprise verifying authenticity of each of the multiple software modules based on the respective module signatures for the multiple software modules, wherein loading the system image is further based on verifying the authenticity of each of the multiple software modules.

15. The device of claim 14, wherein verifying the authenticity of each of the multiple software modules comprises:

generating a signature for each of the multiple software modules; and comparing the generated signature for each module to a stored signature for the module that was included in the data set that was processed to generate the image-level signature.

16. The device of claim 11, wherein the operations further comprise:

obtaining a first product identifier from a secure data storage area of the device;

obtaining a second product identifier from the second certificate; and verifying that the second product identifier matches the first product identifier;

wherein loading the system image is further based on verifying that the second product identifier matches the first product identifier.

17. One or more non-transitory computer-readable media storing instructions that, when executed by one or more processors, cause the one or more processors to:

extract a public key from a secure data storage area of a device;

extract a first certificate for an intermediate key and a second certificate for a signing key, the first certificate and the second certificate being extracted from a system image that is for a particular product, the system image comprising multiple software modules, a data set including module signatures for the multiple software modules, and a system image signature generated using a private key for the particular product, the system image signature being based on the data set including the module signatures for the multiple software modules;

verify a signature of the first certificate using the public key;

after verifying the signature of the first certificate, verify the second certificate using a public key in the first certificate; and in response to verifying the second certificate, load the system image during a boot process of the device.

18. The one or more non-transitory computer-readable media of claim 17, wherein the instructions further include instructions that, when executed, cause the one or more processors to:

determine (i) a first key version number indicated by the first certificate for the intermediate key, and (ii) a second key version number indicated by the second certificate for the signing key;

determine that (i) the first key version number is greater than or equal to a first minimum version number stored by the device, the first minimum version number corresponding to the intermediate key, and (ii) that the second key version number is greater than or equal to a second minimum version number stored by the device, the second minimum version number corresponding to the signing key; and wherein loading the system image is further based on determining that (i) the first key version number is greater than or equal to the first minimum version number, and (ii) the second key version number is greater than or equal to the second minimum version number.

19. The one or more non-transitory computer-readable media of claim 17, wherein the multiple software modules each include executable code that is executed during the boot process of the device;

wherein the system image includes an image-level signature generated for a collection of data that includes the module signatures for the multiple software modules, the image-level signature being generated using the signing key;

wherein the instructions further comprises instructions that when executed cause the one or more processors to verify the image-level signature using a public key in the second certificate; and wherein loading the system image is further based on verifying the image-level signature using a public key in the second certificate.

* * * * *